United States Patent
Liu

(10) Patent No.: US 10,523,041 B2
(45) Date of Patent: Dec. 31, 2019

(54) BATTERY MANAGEMENT INTEGRATED CIRCUIT

(71) Applicant: Integrated Device Technology, Inc., San Jose, CA (US)

(72) Inventor: Rui Liu, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 0 days.

(21) Appl. No.: 15/642,774

(22) Filed: Jul. 6, 2017

(65) Prior Publication Data

US 2018/0013314 A1 Jan. 11, 2018

Related U.S. Application Data

(60) Provisional application No. 62/359,630, filed on Jul. 7, 2016.

(51) Int. Cl.
| | |
|---|---|
| *H02J 7/00* | (2006.01) |
| *H02J 7/06* | (2006.01) |
| *H02J 50/12* | (2016.01) |
| *H02J 7/02* | (2016.01) |
| *H04B 5/00* | (2006.01) |

(52) U.S. Cl.
CPC .............. *H02J 7/06* (2013.01); *H02J 7/0013* (2013.01); *H02J 7/0072* (2013.01); *H02J 7/025* (2013.01); *H02J 50/12* (2016.02); *H04B 5/0037* (2013.01); *H04B 5/0081* (2013.01); *H02J 7/0093* (2013.01); *H02J 2007/0095* (2013.01)

(58) Field of Classification Search
CPC .. H02J 7/025; H02J 50/12; H02J 50/80; H02J 50/10; H02J 50/40; H02J 5/005; H02J 7/0052; H02J 2007/0098

USPC .......................................................... 320/108
See application file for complete search history.

(56) References Cited

U.S. PATENT DOCUMENTS

| | | | |
|---|---|---|---|
| 2013/0077361 A1 | 3/2013 | Low et al. | |
| 2013/0249479 A1* | 9/2013 | Partovi .................. | H02J 7/025 320/108 |
| 2013/0271069 A1 | 10/2013 | Partovi | |
| 2014/0111153 A1* | 4/2014 | Kwon ..................... | H02J 7/025 320/108 |
| 2015/0364928 A1* | 12/2015 | Yen ....................... | H04B 5/0037 320/108 |
| 2016/0118843 A1* | 4/2016 | Kim ........................ | H02J 7/04 320/108 |

(Continued)

FOREIGN PATENT DOCUMENTS

WO 2015105924 A1 7/2015

OTHER PUBLICATIONS

International Search Report for PCT Application No. PCT/US2017/041103 Issued by the U.S. International Searching Authority dated Sep. 29, 2017; Corresponding Ref.: No. 70107.504WO01 3141-WO; pp. 1-2.

(Continued)

*Primary Examiner* — Nghia M Doan
(74) *Attorney, Agent, or Firm* — Haynes and Boone, LLP

(57) ABSTRACT

In accordance with aspects of the present invention, a wireless power integrated circuit is presented. The wireless power integrated circuit includes a wireless power receiver circuit; a battery charger circuit; and a microprocessor coupled to control the wireless power receiver and the battery charger circuit.

15 Claims, 6 Drawing Sheets

(56) References Cited

U.S. PATENT DOCUMENTS

2016/0182826 A1    6/2016   Blum et al.

OTHER PUBLICATIONS

Written Opinion for PCT Application No. PCT/US2017/041103 issued by the U.S. International Searching Authority dated Sep. 29, 2017; Corresponding Ref.: No. 70107.504WO01 3141-WO; pp. 1-5.

European Search Report from European Patent Application No. 17824982.7, dated Oct. 10, 2019 pp. 1-9.

* cited by examiner

BATTERY MANAGEMENT INTEGRATED CIRCUIT

RELATED APPLICATION

The present application claims priority to and the benefit of filing date of U.S. Provisional Patent Application No. 62/359,630; entitled "BATTERY MANAGEMENT," filed Jul. 7, 2016, which is incorporated by reference herein in its entirety.

TECHNICAL FIELD

Embodiments of the present invention are related to wireless power receivers and, specifically, to an efficient integrated circuit with a battery management circuit in a wireless power receiver.

DISCUSSION OF RELATED ART

Mobile devices, for example smart phones, tablets, wearable devices and other devices are increasingly using wireless power charging systems. There are multiple different standards for wireless transfer of power, which utilize a variety of different transmission frequencies. Frequencies used can vary widely, for example from less than 100 KHz to over 6.78 MHz.

The more common standards for wireless transmission of power include the Alliance for Wireless Power (A4WP) standard and the Wireless Power Consortium standard, the Qi Standard. Under the A4WP standard, for example, up to 50 watts of power can be inductively transmitted to multiple charging devices in the vicinity of a coil at a power transmission frequency of around 6.78 MHz. Under the Wireless Power Consortium, the Qi specification, a resonant inductive coupling system is utilized to charge a single device at the resonance frequency of the device. In the Qi standard, the receiving device coil is placed in close proximity with the transmission coil while in the A4WP standard, the receiving device coil is placed near the transmitting coil, potentially along with other receiving coils that belong to other charging devices.

Therefore, there is a need to develop better wireless receiver technologies.

SUMMARY

In accordance with aspects of the present invention, a wireless power integrated circuit is presented. The wireless power integrated circuit includes a wireless power receiver circuit; a battery charger circuit; and a microprocessor coupled to control the wireless power receiver and the battery charger circuit.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
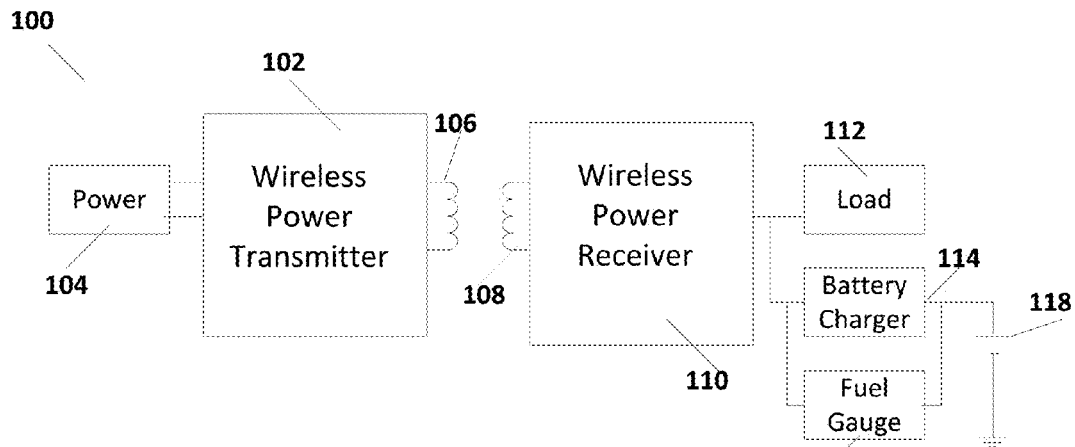
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coils 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, a battery charger 114, and/or other components of a mobile device. Receiver 110 typically includes rectification to convert the received AC power to DC power for load 112. As is further shown in FIG. 1, a battery charger 114 and fuel gauge 116 may also be coupled to charge a battery 118 from power received by wireless power receiver 110. However, in conventional receiver systems these components are separate components, each requiring their own supporting circuitry and controls. These conventional configurations, therefore, use a large amount of space on a printed circuit board (PCB) and also may be inefficient.

Figure 2:
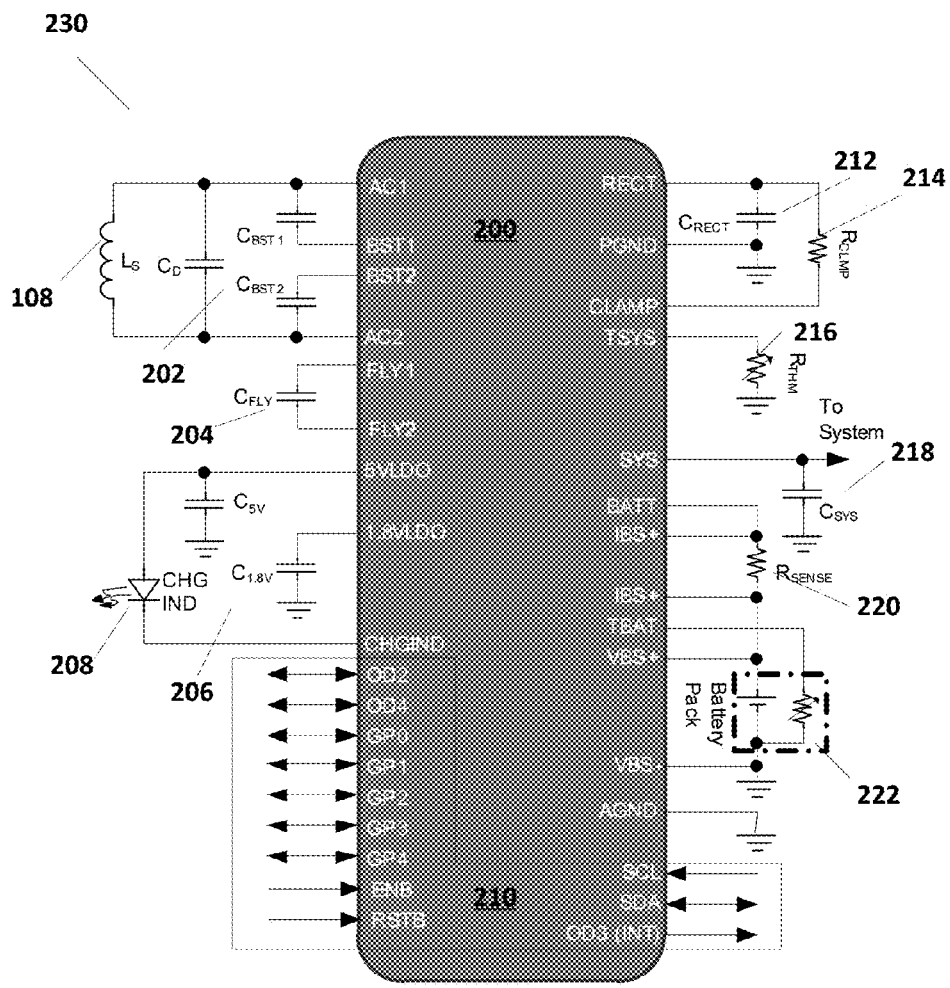
FIG. 2 illustrates a receiver of a wireless power transmission system according to some embodiments.

FIG. 2 illustrates an example of receiver 230 according to some embodiments of the present invention. As is illustrated in FIG. 2, receiver 230 includes a battery management integrated circuit 200 and external circuitry to support the functions on IC 200. In particular, IC 200 incorporates a wireless receiver, a battery charger, a fuel gauge, and other circuitry onto a single chip integrated circuit. IC 200 can then be controlled and operated by a single microcontroller system in such a way that is highly efficient. Further, external circuitry includes the resistive, inductive, and capacitive components that cannot be easily formed on IC 200 but are used on supporting the remaining circuitry that can be formed on IC 200. Consequently, IC 200 and its supporting components occupy a much smaller area of PCB while being more energy efficient than conventional circuitry.

In accordance with some embodiments, receiver 230 may be Qi-based and, with IC 200, may include minimal external components outside of IC 200. In some embodiments, receiver 230 may operate at frequencies up to about 1 MHz of operation frequency and produce a rectified voltage at output RECT, VRECT, of from 3.2V to 6.0 V in 10 mV steps.

As is illustrated in FIG. 2, the wireless power receiver, battery charger, and fuel gauge are incorporated in battery management integrated circuit 200. FIG. 2 illustrates wireless power receiver components 202, which includes wireless power receive coil 108 in parallel with a capacitor $C_D$ coupled between pins AC1 and AC2. A capacitor 204 $C_{BST1}$ is coupled between the BST1 pin and the AC1 pin. A capacitor $C_{BST2}$ is coupled between the BST2 pin and the AC2 pin. As is further indicated, a fly capacitor $C_{FLY}$ is coupled between pins FLY1 and FLY2 and may be internally coupled to a charge pump and low drop-out (LDO) regulator. Other LDO regulators, for example a 1.8V LDO and a 5V LDO, on integrated circuit 200 can be coupled to LDO capacitors 206 $C_{1.8V}$ and $C_{5V}$ at 1.8 LDO pin and 5 LDO pin, respectively. An LED 208 may also be coupled to the 5V LDO pin.

Integrated circuit 200 may further includes a microprocessor that controls and coordinates the functioning of IC 200. Consequently, several interfacing pins 210 may be utilized to communicate with and configure integrated circuit 200. Additionally, interface pins 210 may include enable ENB and reset RSTB pins. Interfaces may include any interface, including an I2C interface and EEPROM interfaces. Further, some of interface pins 210 may be dedicated for debugging purposes.

Integrated circuit 200 may further include onboard rectification coupled to receive wireless power from receive coil 108. Consequently, a rectifier capacitor 212 may be coupled between a rectifier output pin RECT and ground at pin PGND. Additionally, a clamping resistor 214 may be coupled between the RECT pin and a CLAMP pin. In some embodiments, there may be a thermal resistor coupled to a TSYS pin. A capacitor 218 may be coupled to a SYS pin, which provides output voltage to a further system.

A battery pack 222 may be coupled to receive a charging current from integrated circuit 200. A BAT pin provides current to battery pack 222. Current can be monitored by providing a sense resistor 220 between the BAT pin and battery pack 222 and monitoring the voltage across sense resistor 220 between the IBS pins. Battery pack 222 may include a thermal resistor that can be monitor at a TBAT pin of integrated circuit 200. The voltage across battery pack 222 can be monitored at VBS+ and VBS− pins.

Various processing and control for receiving power from receiver coil 108, output power at the SYS pin, and providing current for charging battery pack 222 at the BATT pin is supplied on integrated circuit 200. Integrated circuit 200 may include, for example, a linear charger. Example characteristics of such a linear charger may include Pre-Q operation (+/−10% current accuracy); pulsing constant current (CC) operation supporting fast charging (in some embodiments with a maximum CC current of 800 mA); LDO regulation for continuous voltage (CV) operation; battery and ambient temperature monitoring; thermal regulation, for example according to Japan Electronics and Information Technology industries Association (JEITA) regulation; high battery voltage sense accuracy (e.g., +/−0.5%); high full scale current sense accuracy (e.g., +/−0.5%); and charging status indication. IC 200 may further include a fuel gauge with column counting FG, sleep mode current (e.g., 10 uA), battery empty warning, and state-of-charge (SOC) percentage display. In some embodiments, IC 200 may be packaged in a 5×7 bump array 0.4 mm WLCSP in a 3.0 mm×2.2 mm package size. These specifications are exemplary only of some embodiments and should not be considered limiting.

Embodiments of IC 200 may provide for fast charging when the battery is dead (i.e., discharged) or near empty. IC 200 may include, for example, an ARM Cortex-MO processor and multi-time programmable (MPT) non-volatile memory for flexible programmability and self-learning FG (Asynchronous Buffered Computation Design and Engineering Framework Generator) programming. IC 200 may include an application (AP) reset function, I2C communication, and shelf mode for storage or shipping. Use of IC 200 may reduce the component inventory and include the lowest bill of materials (BOM) and smallest printed circuit board (PCB) area for a complete battery management system (WP power, charger, and fuel gauge). IC 200 according to some embodiments provides for a self-sufficient and complete battery management IC for variable devices.

The following table provides some comparison of an embodiment of IC 200 with conventional wireless power receiver and battery charger systems. As is illustrated, IC 200 can be more power efficient, requires less printed circuit board (PCB) space, fewer external components, and can provide power in the presence of a wireless power transmitter even if the battery is dead.

| Problem Solution | Competitor A | Competitor B | Embodiment of IC 200 | User Experience |
| --- | --- | --- | --- | --- |
| Power dissipation in CC mode (mw) | 450 | 350 | 200 | Lower device temperature |

-continued

| Problem Solution | Competitor A | Competitor B | Embodiment of IC 200 | User Experience |
|---|---|---|---|---|
| (Vout = 4.5 V, Vbat-3.5 V, Ibat = 200 mA) Power dissipation in fast charging mode (mW) (ICC = 400 mA) | 950 | 770 | 300 | New feature of charging 5 minutes for 2-4 hour activity |
| Total PCB space (mm^2) | ~48 | ~46 | ~28 | ~40% smaller PCB area |
| Number of External Components | 30 | 24 | 20 | Lower system solution cost |
| Power path | No | No | Yes | Provides power with wireless transmitter when battery is dead. |

Figure 3:
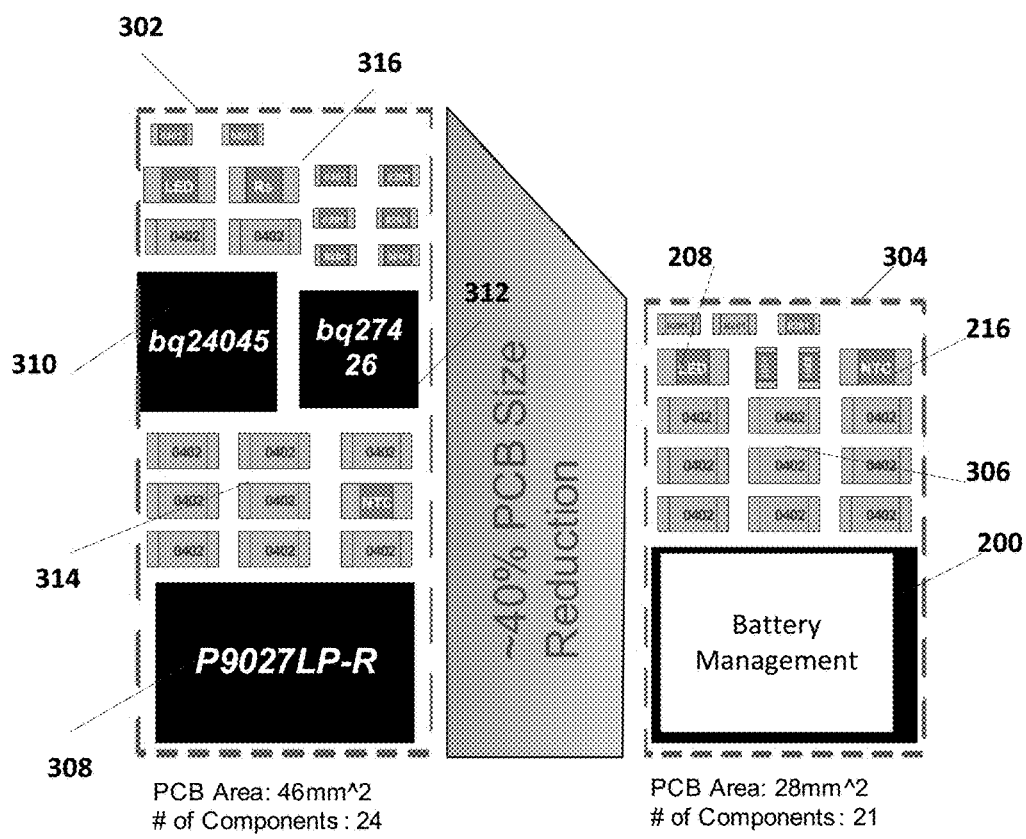
FIG. 3 illustrates a comparison of a battery management IC according to some embodiments with a conventional IC.

FIG. 3 illustrates a comparison between printed circuit board area used by a popular Integrated Device Technology P9027LP-R wireless power receiver for charging a battery and an example embodiment of IC 200. As illustrated in the layout of PCB 302 for circuit 308, which is the IDT P9027LP-R, includes components 314, which may be resistors and capacitors and includes one negative thermal coefficient (NTC) thermal resistor, a battery charger 310, a fuel gauge 312, and further components 316 which may include resistors, capacitors, and a LED. In total, the area of PCB 302 is 46 mm² with a total of 24 components. As is further illustrated, PCB 304 with an implementation of IC 200 also includes external resistors capacitors 306, along with thermal resistor 216 and LED 208, and includes a total of 21 components. The area occupied on PCB 304 can be 28 mm². This represents a total reduction in PCB area used by about 40%.

Figure 4:
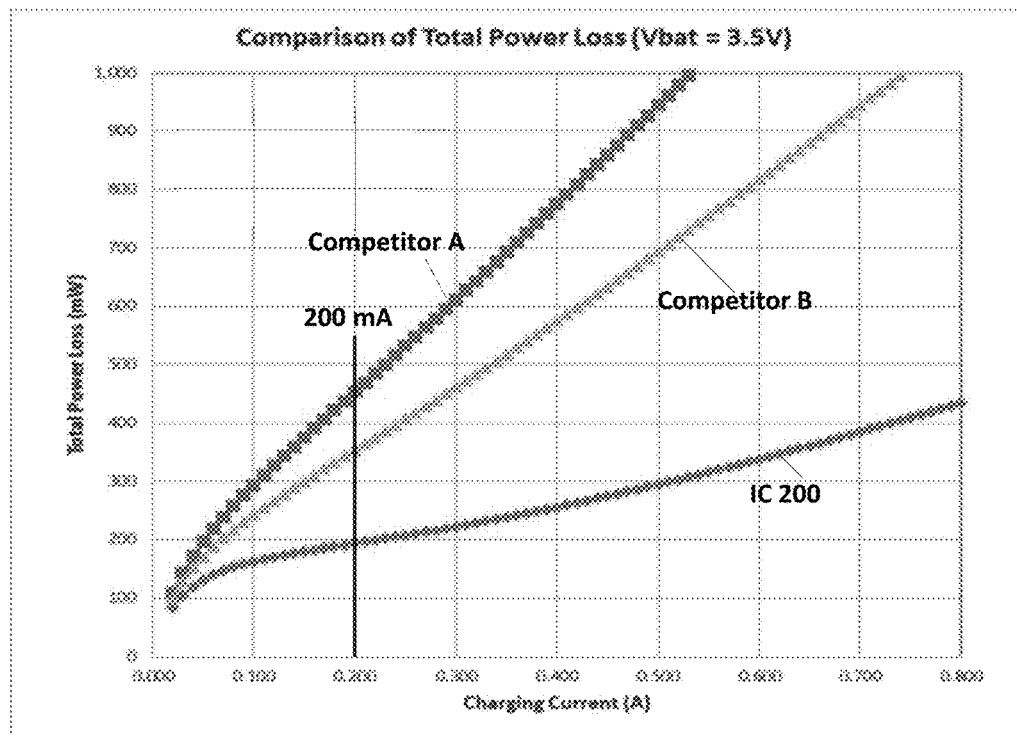
FIG. 4 illustrates comparison of total power loss with a battery management IC according to some embodiments.
Figure 5:
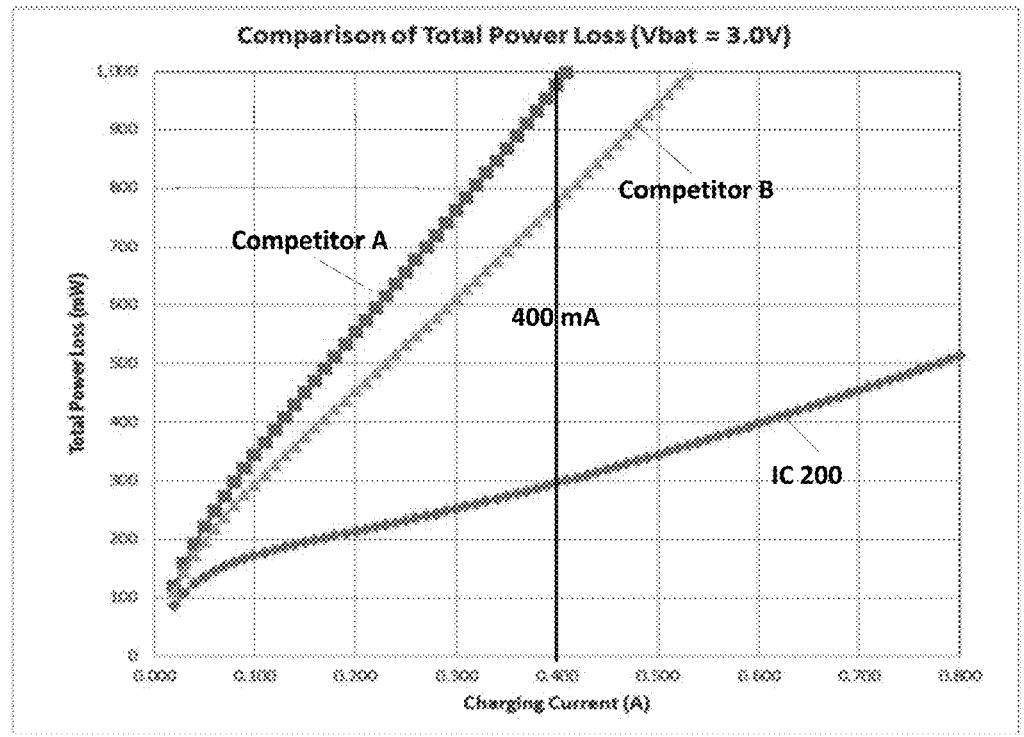
FIG. 5 illustrates another comparison of total power loss with a battery management IC according to some embodiments.

FIG. 4 illustrates total power loss comparison for constant current charging for the systems highlighted in the above table. In FIG. 4, the 200 mA charging current line is highlighted illustrating the power loss for each of the competitor products. FIG. 5 illustrates total power loss comparison for fast charging characteristics for the systems highlighted in the above table. Again, the 400 mA line is illustrated for comparison.

Figure 6:
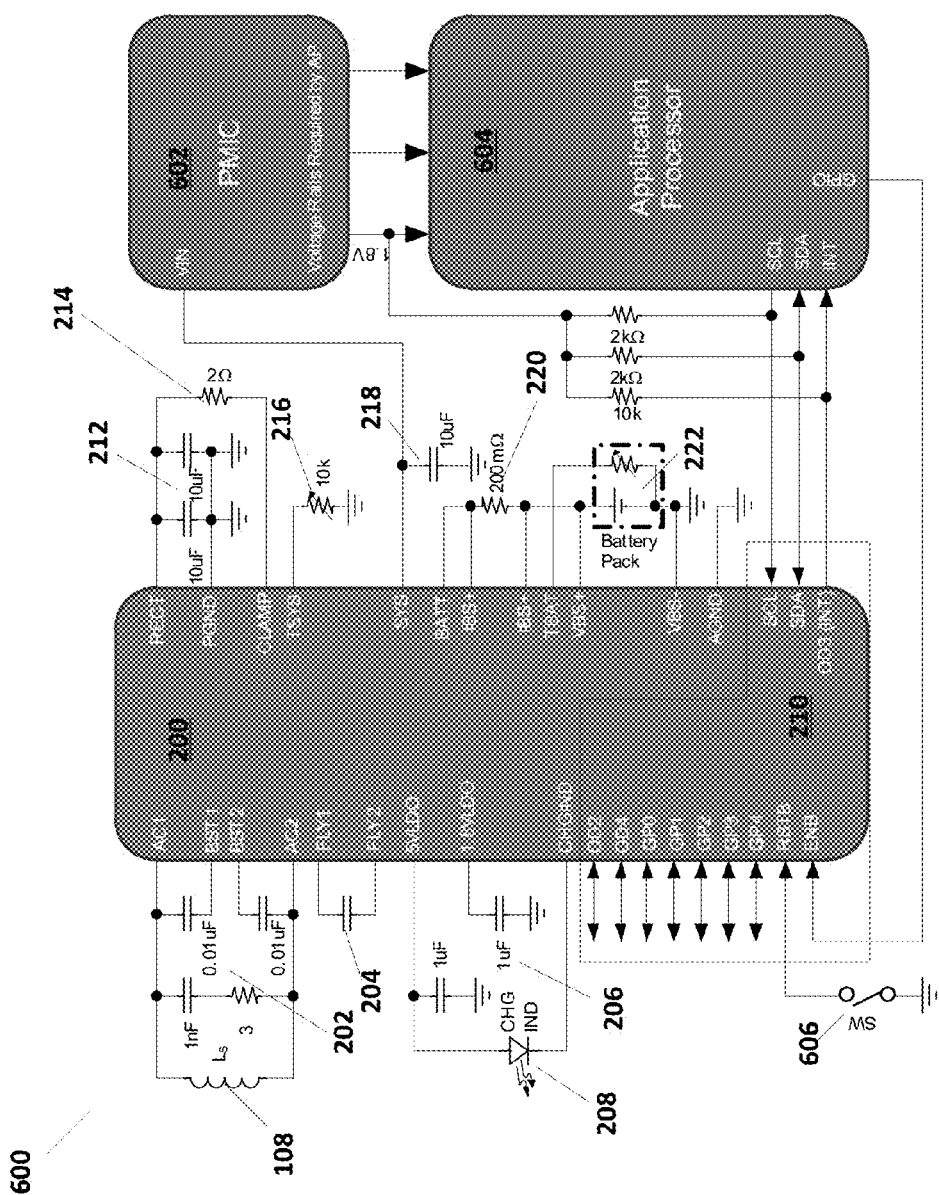
FIG. 6 illustrates the IC shown in FIG. 2 used in a device.

As is illustrated in FIG. 3, the PCT area used by IC 200 and its external circuitry is much reduced from that of its competitor products. Furthermore, as is illustrated in FIGS. 4 and 5, the power loss performance of IC 200 is greatly improved from that of its competitors as well. This improvement in performance and in area utilization results from the FIG. 6 illustrates a system 600 with IC 200 used in a device with a power management integrated circuit (PMIC) 602 and an application processor 604. The external components include the components illustrated and discussed above in FIG. 2. As is illustrated, the SYS pin from IC 200 provides an input voltage to PMIC 602. PMIC 602 provides voltages to application processor 604. Applications process can communicate with IC 200 through an I2C interface using the SCL/SDA pins on IC 200. Other pins can be used to send or receive data between application processor 604 and IC 200. Furthermore, a switch 606 can provide a reset signal to the reset pin RSTB of IC 200. Additionally, IC 200 may receive an enable signal from a GPIO port of application processor 604 on an ENB pin of IC 200. Application processor 604 can be adapted for any application, including laptops, phones, or other digital devices.

As is illustrated in FIG. 6, there is no involvement from the application processor 604 to manage battery charging, charging parameter setting, or performing fuel gauge functions, thus extending battery life. All of these functions are performed on IC 200 and can be configured by application processor 604 and monitored by application processor 604. Further, with a power path feature the application processor can be powered directly from the wirelessly transmitted power received on receive coil 108, even if the battery has died. As discussed above, power is provided on the SYS pin of IC 200 and can be used by PMIC 602 to power application processor 604 without involvement from battery pack 222.

Figure 7:
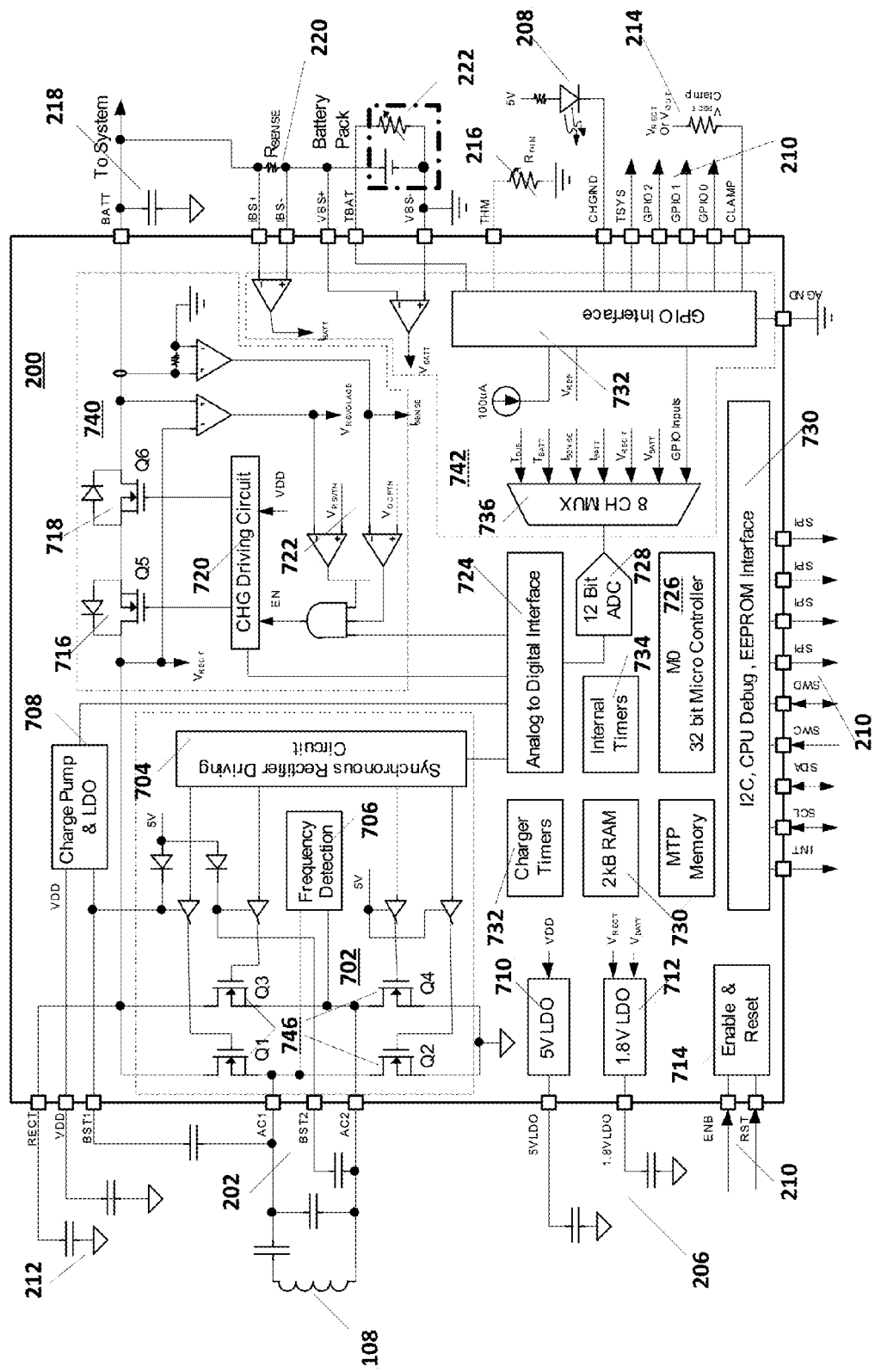
FIG. 7 illustrates a block diagram of a battery management IC according to some embodiments.

FIG. 7 illustrates a block diagram of an embodiment of IC 200. As illustrated in FIG. 7, IC 200 includes a microcontroller 726. Microcontroller 726 can be any microprocessor or controller such as the ARM processor discussed above. In some embodiments microcontroller 726 is coupled to memory 730, which can include a combination of volatile and non-volatile memory. Memory 730 stores programming instructions that can be executed on microcontroller 726, data, and operating parameters for operation of IC 200. In particular, microcontroller 726 is coupled to operate wireless power receiver 702, battery charging circuit 740, and monitor and fuel gauge 742.

Microcontroller 726 is coupled to interface 730 to receive digital data on interface pins 210. Further interface pins 210 may be coupled to enable and reset 714. Further interface pins 210 may be coupled to a GPIO interface 732. Consequently, IC 200 can be configured through interface 730, new programming may be loaded and operation parameters may be provided through interface 730.

Microcontroller 726 may further be coupled to timers 732 and 734 that can provide timing for various operations of IC 200, including charging and wireless power receipt. Microcontroller is further coupled to receive data through interface 724, which can be used to provide digital instructions to various components of IC 200 and receive digitized data. As is illustrated in FIG. 7, an ADC 728 is coupled to gauge 742 that receives various input operating parameters, for example including the temperature $T_{DIE}$ measured from resistor 216 coupled to the THM pin through GPIO interface 732; battery temperature $T_{BATT}$ measured from battery pack 222 at the TBAT pin; the current $I_{SENSE}$ measured at the output of switching transistor 718; the current $I_{BAT}$ measured across the IBS+ and IBS− pins of IC 200; the rectifier voltage VRECT; the battery voltage $V_{BATT}$; and other parameters received through GPIO interface 732. A multiplexer 736 receives each of the analog signals and provides a selected one of them to ADC 728, which provides digitized data to interface 724 for use in control electronics and microcontroller 726. Multiplexer 736, for example, can receive a selection signal from microcontroller 726 to measure one of the plurality of analog signals input to multiplexer 736.

As illustrated in FIG. 7, IC 200 includes a wireless power receiver 702. Receiver circuit 702 in this includes a rectifier 746 formed by FETs Q1, Q2, Q3, and Q4 that are driven by synchronous rectifier driving circuit 704 in order to receive power from receiver coil 108. Rectifier circuit 746 provides the rectifier voltage VRECT on the RECT pin of IC 200. A frequency detecting circuit 706 detects the frequency of wireless power transfer to determine how transistors Q1, Q2, Q3, and Q4 are drive by synchronous rectifier driving circuit 704. In some embodiments, frequency detection 706 provides data to microcontroller 726, which uses that data to provide operating instructions to synchronous rectifier driving circuit 704 appropriate for receiving synchronous data.

A charge pump and low drop-out regulator (LDO) 708 provides a voltage Vdd. The voltage Vdd can be provided to LDOs 710 and 712 to provide power, for example a 5V regulated output and a 1.8 V regulated output, for other aspects of IC 200.

IC 200 further includes a charging circuit 740. Charging circuit 740 includes switching transistors 716 and 718 that are driving by a charging driving circuit 720 which is coupled to a circuit 722. As is illustrated, and discussed above, charging circuit provides charging current to an external battery pack 222 through a battery pin BATT.

Figure 8:
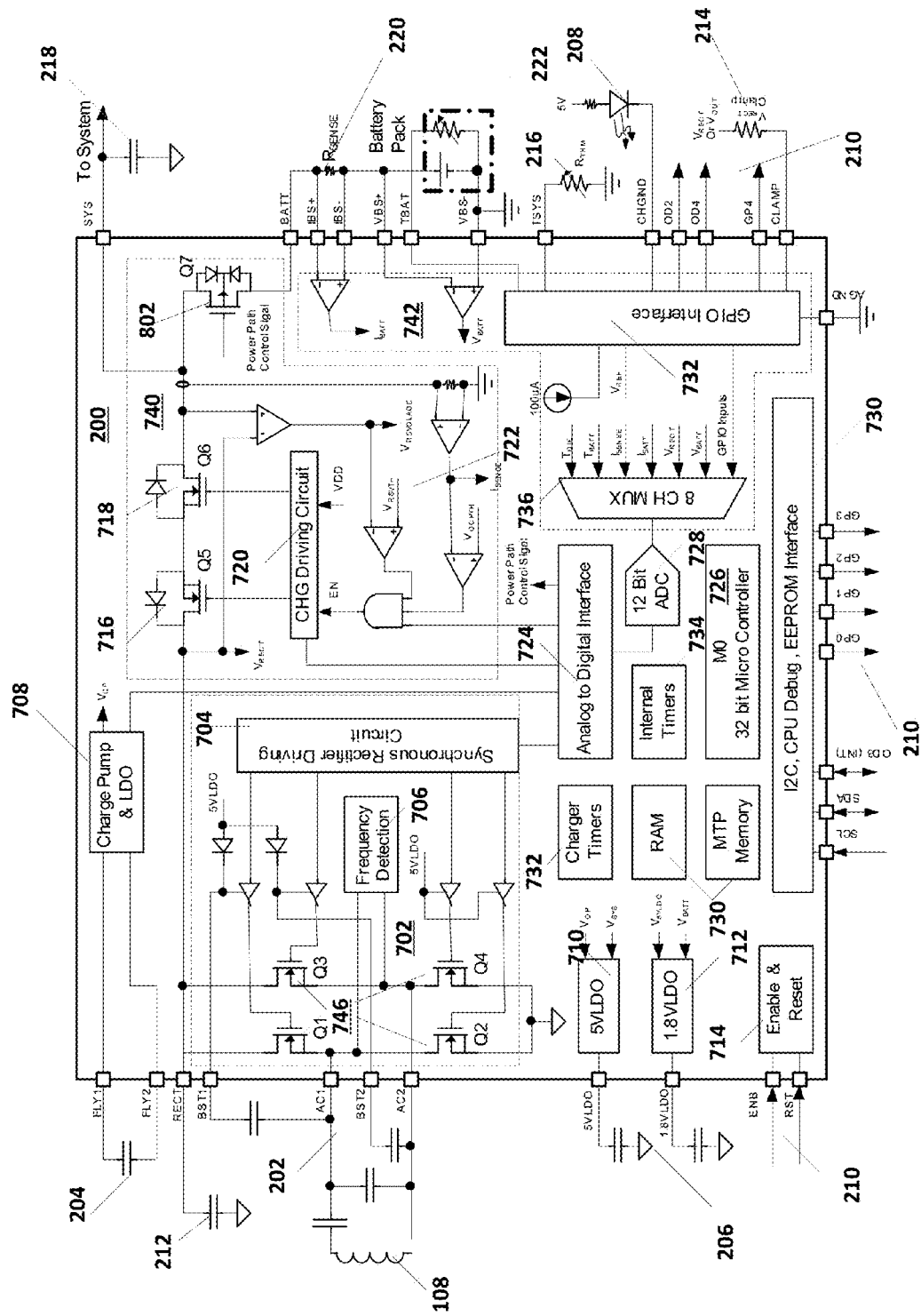
FIG. 8 illustrates another block diagram of a battery management IC according to some embodiments.

In the embodiment illustrated in FIG. 7, the external system can be powered through the BATT pin. FIG. 8 illustrates another embodiment that illustrates a power path that is better able to supply received wireless power to an external system if battery pack 222 is dead. As illustrated in FIG. 8, IC 200 can include a power control circuit 802 that directs power to the BATT pin, in order to charge battery pack 222. As illustrated, battery to the system can be supplied through a SYS pin. A power pack control signal, which is provided by microcontroller 726, supplied to circuit 802 controls whether power is supplied to battery pack 222. As such, if battery pack 222 is uncharged and a system is coupled to the SYS pin, then circuit 802 may be inactive to provide power to the system.

As is illustrated in FIGS. 7 and 8, microprocessor 726 is coupled in IC 200 to control wireless power receiver 702 and battery charging circuit 740. Microprocessor 726, and its surrounding circuit, is also coupled to monitor analog parameters through gauge circuit 742. Such parameters, as described above, are used by microprocessor 726 to control functions of wireless receiver 702 and battery charging circuit 740. These parameters are also used to provide fuel gauge functions (e.g. monitoring the state of charge of external battery pack 222). Fuel gauge results can be communicated to external devices such as, for example, application processor 604, through interface 730. Instructions to microprocessor 726 to monitor and control each aspect of IC 200 are stored in memory 730.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power integrated circuit (IC), comprising:
   a wireless power receiver circuit;
   a battery charger circuit coupled to the wireless power receiver circuit, the battery charger circuit coupled to a battery output pin of the integrated circuit to charge an external battery coupled directly to the battery output pin; and
   a microprocessor coupled to control the wireless power receiver and the battery charger circuit to charge the external battery,
   wherein the wireless power receiver circuit, the battery charger circuit, and the microprocessor are all formed on a single IC to form the wireless power IC.

2. The integrated circuit of claim 1, wherein the wireless power receiver circuit formed on the IC includes a rectifier that receives power from an external receiver coil coupled to the single IC and provides a rectifier voltage.

3. The integrated circuit of claim 2, wherein the rectifier includes transistors controlled by a synchronous rectifier driving circuit formed on the IC and operating to efficiently receive wireless power and provide the rectifier voltage.

4. The integrated circuit of claim 1, wherein the battery charger circuit includes switching transistors controlled by a charging driving circuit formed on the single IC to provide charging to a battery pack coupled to the IC.

5. The integrated circuit of claim 1, further including a power path control circuit formed on the single IC to provide power to a system output chip when a battery pack coupled to the battery charger circuit through the power path control circuit is discharged.

6. The integrated circuit of claim 1, further including a gauge circuit formed on the single IC and configured to receive and digitize analog data.

7. The integrated circuit of claim 6, wherein the analog data includes one or more of a battery current, a battery pack temperature, a temperature, a battery voltage, a rectifier voltage, and an output current.

8. The integrated circuit of claim 1, further including a digital interface formed on the IC and coupled to the microprocessor.

9. The integrated circuit of claim 8, wherein the digital interface is configured to receive parameters from a source external to the IC by which the microprocessor controls the IC.

10. A wireless power integrated circuit (IC), comprising:
    a microprocessor;
    a wireless power receiver coupled to the microprocessor; and
    a battery charging circuit coupled to the microprocessor and the wireless power receiver, the battery charging circuit coupled to a battery output pin of the integrated circuit to charge an external battery coupled directly to the battery output pin,
    wherein the microprocessor, the wireless power receiver, and the battery charging circuit are formed on a single IC to form the wireless power IC, and
    wherein the microprocessor is configured to execute instructions to
    control the receipt of wireless power, and
    control charging of an external battery pack coupled to the battery output pin of the single IC.

11. The integrated circuit of claim 10, further including gauge circuitry formed on the single IC and coupled to the microprocessor and wherein the microprocessor is further configured to execute instructions to provide battery status parameters.

12. The integrated circuit of claim 10, wherein the gauge circuitry receives and digitizes analog signals.

13. The integrated circuit of claim 12, wherein the gauge circuit includes a multiplexer that receives a plurality of analog signals and an analog-to-digital converted coupled to the multiplexer to digitize one of the plurality of analog signals in response to selection signals.

14. The integrated circuit of claim 13, wherein the microprocessor adjusts control of the wireless power receiver and/or the charging circuit according to one or more of the plurality of analog signals.

15. The integrated circuit of claim 10, further including a power path circuit formed on the single IC and wherein the microprocessor further executes instructions to direct power to a system coupled to the single IC even if a battery pack coupled to the single IC is discharged.

* * * * *